Nov. 1, 1966 N. M. HAYNES 3,283,258

ADJUSTABLE EQUALIZER CIRCUIT FOR AUDIO AMPLIFIERS

Filed July 8, 1964

INVENTOR.
Nathan M. Haynes
BY S. Stephen Baker
ATTORNEY

United States Patent Office 3,283,258

Patented Nov. 1, 1966

3,283,258

ADJUSTABLE EQUALIZER CIRCUIT FOR AUDIO AMPLIFIERS

Nathan M. Haynes, 398 Broadway, New York, N.Y.

Filed July 8, 1964, Ser. No. 381,116
9 Claims. (Cl. 330—21)

Figure 1:
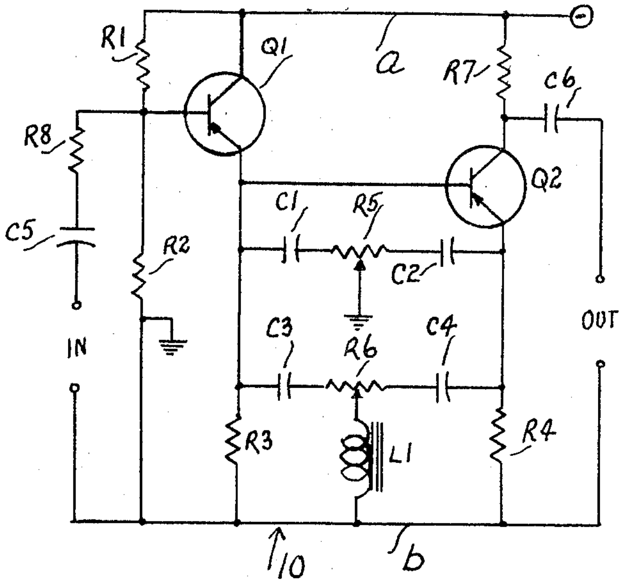

The present invention relates generally to improvements in electrical networks, and it relates particularly to an improved adjustable equalizer or tone control network for audio amplifiers.

In audio amplifiers it is a conventional practice to provide equalizer networks both of the objective and subjective type so as to achieve or approach a response that is linear or flat over the audio range of interest. In recording and playback systems, for example, the objective type of equalizer network is generally of a fixed type employed to compensate for nonlinearities which are inherent in the system. Thus in magnetic tape recordings the pickup response in the low frequency range is accompanied by a 6 db gain per octave until a peak frequency is reached and thereafter there is a decreasing response with increased frequency. The objective equalizer network is designed to automatically compensate for such non-linearities so as to provide a substantially flat frequency response, part of such compensation being effected in the recording per se, and the remaining compensation being effected by appropriately designed filter networks.

The subjective equalizer network, on the other hand, is employed to provide the listener with a personally or optionally adjustable control both in the high frequency and low frequency audio ranges of the amplifier circuit and is employed as well to compensate for non-linearities in the output transducer or loudspeaker. The subjective equalizer or tone control is generally continuously adjustable and is generally either of the feedthrough attenuation or inverse feedback type. In the feedthrough subjective equalizer circuit, the high frequency or low frequency band or both are adjustably attenuated in the signal feeding through the amplifiers whereas in the inverse feed back equalizer a frequency discriminating variation is produced in the feedback path. However, the adjustable subjective equalizer networks heretofore employed, whether of the feedthrough or inverse feedback type, possessed numerous drawbacks and disadvantages. They have been inefficient, of limited range, often possessed poor response and otherwise left much to be desired.

It is a principal object of the present invention to provide an improved audio frequency response in an audio amplifier or the like, wherein a wide range is covered.

Another object of the present invention is to provide an improved adjustable subjective equalizer network for use in audio amplifiers and wherein variable equalization over a wide range is obtained by a combination feedthrough-feedback circuit.

A further object of the present invention is to provide an improved electrical network of the above nature characterized by its simplicity, versatility, adaptability, superior characteristics, and wide range of adjustability.

Figure 2:
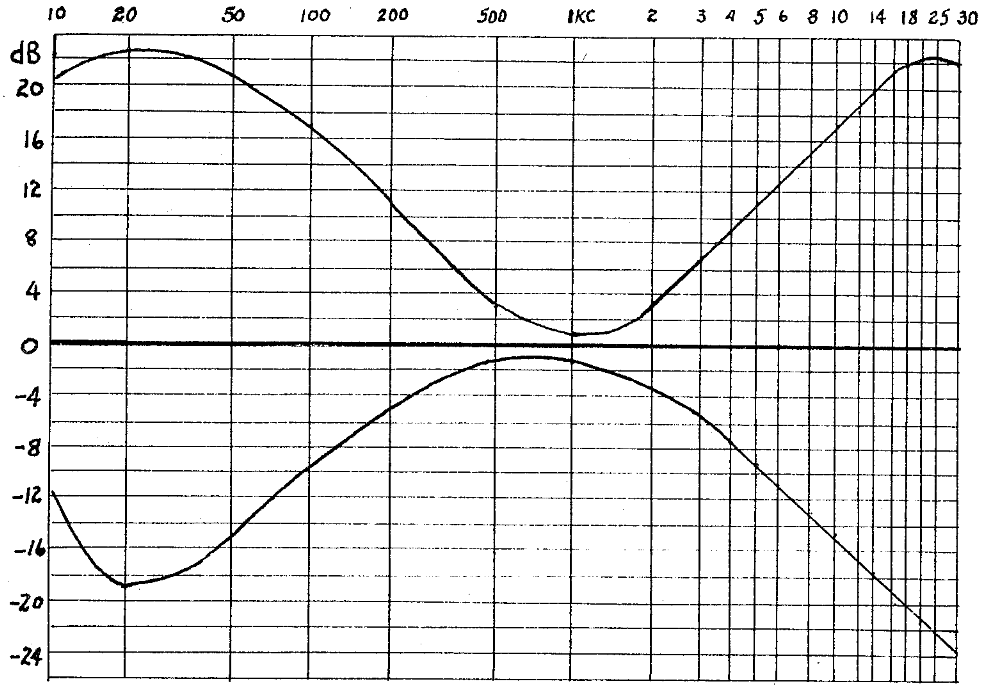

The above and other objects of the present invention will become apparent from a reading of the following description taken in conjunction with the accompanying drawing, wherein:

FIGURE 1 is a circuit diagram of a subjective equalizer network embodying the present invention; and FIGURE 2 is a graph illustrating the attenuation control range thereof.

The present invention contemplates in its preferred form an equalizer network including an amplifier comprising a pair of first and second transistors each including first emitter and base electrodes, and second emitter and base electrodes respectively. The first emitter electrode is directly connected to the second base electrode and each emitter electrode is connected to ground through a corresponding emitter resistor. The first emitter electrode is connected to the second emitter electrode through a series connected first capacitor, the resistance element of a first potentiometer and a second capacitor, the arm of the first potentiometer being grounded to define the high frequency control. The first emitter is also connected to the second emitter through a series connected high value third capacitor, a second potentiometer and a high value fourth capacitor, the arm of the second potentiometer being connected to ground through an inductor to define the low frequency control. The input signal is applied between ground and the first base electrode and the frequency controlled output signal is taken between ground and the collector of the second transistor.

Referring now to the drawing, FIGURE 1 shows one preferred arrangement of the equalizer circuit in connection with an audio amplifier which is represented by the amplifier transistors although a complete device will generally employ additional amplifier stages or the like as well as an output stage all of which are conventional and need not be shown herein. Thus the device comprises amplifier transistors to which the feedthrough and feedback outputs of an equalizer network 10 are connected as will be fully described hereinafter.

Referring now to FIGURE 1, which illustrates a preferred embodiment of my improved adjustable equalizer network, the reference numeral 10 generally designates such network which may be included in any desired stage of an audio amplifier in the manner well known in the art and preferably between the conventional preamplifier or other primary stage and the output or driver stage. The equalizer network 10 is illustrated as applied between a pair of first and second transistors Q1 and Q2 illustrated as of the PNP type although NPN transistors may be employed with corresponding reversal of the energizing current polarity, each of the transistors being provided with corresponding emitter, collector and base electrodes. The base electrode of the first transistor Q1 is connected through a resistor R1 to a line *a* which in turn is connected to the negative terminal of a voltage source, the positive terminal of which voltage source is connected to the ground line *b* and the base electrode is also connected to the ground line *b* through a resistor R2. The input terminals to the equalizer network 10 are connected respectively to the ground line *b* and through a series connected coupling capacitor C5 and resistor R8 to the base electrode of the transistor Q1. The collector electrode of the transistor Q1 is connected to the negative line *a*.

The emitter electrode of the transistor Q1 is connected to the base electrode of the transistor Q2 and is also connected to the ground line *b* through a first emitter resistor R3. The collector of the transistor Q2 is connected through a resistor R7 to the negative line *a* and the emitter electrode thereof is connected to the ground line *b* through a second emitter resistor R4. The output terminals of the equalizer network 10 are connected respectively to the ground line *b* and through a coupling capacitor C6 to the collector electrode of the transistor Q2.

The emitter electrode of the transistor Q1 is connected through the series connected successive first capacitor C1, the resistance element of a first potentiometer R5, and a second capacitor C2, to the emitter electrode of the transistor Q2. The arm of the first potentiometer R5 is connected to the ground line *b* and defines the high frequency tone control. It should be noted that the capacitors C1 and C2 present a relatively low impedance to the high audio band and a high impedance to the low frequency audio band and that the capacitor C2 preferably is of lower capacitance than the capacitor C1.

The emitter electrode of the transistor Q1 is also connected through the series connected successive D.C. blocking third capacitor C3, the resistance element of a second potentiometer R6 and a D.C. blocking fourth capacitor C4 to the emitter electrode of the transistor Q2. It should be noted that the capacitors C3 and C4 are of high capacitance offering insignificant impedance over the full audio frequency band. The arm of the potentiometer R6 is connected through an inductor L1 to the ground line *b* and defines the low frequency tone control. The inductor L1 is of a value offering a low impedance to the low frequency audio band and a high impedance to the high frequency audio band.

The following values of the various components of the equalizer network 10 are given merely by way of a specific example which has been found highly satisfactory and are not intended to limit the scope of the present invention:

| | | |
|---|---|---|
| C1 | microfarads | 0.22 |
| C2 | do | 0.068 |
| C3, C4 | do | 100 |
| C5, C6 | do | 2.0 |
| Li | henrys | 0.28 |
| Q1, Q2 | | 2N591 |
| R1 | ohms | 330K |
| R2 | do | 100K |
| R3 | do | 2.2K |
| R4 | do | 1.5K |
| R5, R6 | do | 5K |
| R7 | do | 15K |
| R8 | do | 10K |

Considering now the operation of the subjective equalizer network 10 described above, adjustment of the high frequency response is effected by means of the potentiometer R5. When the arm of the potentiometer R5 is in its leftmost position toward the capacitor C1 as viewed in FIGURE 1, the feedthrough signal in the high frequency audio band is filtered and subjected to maximum attenuation being substantially grounded through the capacitor C1 and any of this signal which is fed through effects a high degenerative feedback through the emitter resistor R4. On the other hand, when the arm of the potentiometer R5 is in its rightmost position adjacent to the capacitor C2, a maximum of the audio high frequency signal is fed through since little of it is bypassed to ground. Moreover, the emitter resistor R4 is shunted by the capacitor C2 which offers little impedance to the audio high frequency signal thereby minimizing the attenuation effected by the inverse feedback in the emitter resistor R4 in the high frequency band. With the adjustment of the arm of the potentiometer R5 between the extreme positions thereof the percentage of the audio high frequency signal which is fed through and the percentage thereof which is attenuated by inverse feedback are varied in opposite directions. Thus the percentage of the high frequency signal, appearing at the output of the equalizer network 10 can be adjusted over a very wide range.

Adjustment of the low frequency response is effected by means of the potentiometer R6. When the arm of the potentiometer R6 is in its leftmost position adjacent to the capacitor C3, the feedthrough signal in the low frequency audio band is filtered and subjected to maximum attenuation being substantially grounded through the inductor L1 and capacitor C3 and any of this signal which is fed through effects a high degenerative feedback through the emitter resistor R4. On the other hand, when the arm of the potentiometer R6 is in its rightmost position adjacent to the capacitor C4, a maximum of the audio low frequency range signal is fed through since little of it is bypassed to ground. Moreover, the emitter resistor R4 is shunted by the inductor L1 and capacitor C4 which offer little impedance to the audio low frequency signal thereby minimizing the attenuation effected by the inverse feedback in the emitter resistor R4 in the low frequency band. With the adjustment of the arm of the potentiometer R6 between the extreme positions thereof, the percentage of the audio low frequency signal which is fed through and the percentage thereof which is attenuated by inverse feedback are varied in opposite directions. Thus the percentage of the low frequency signal appearing at the output of the equalizer network 10 can be adjusted over a very wide range.

The range of the high and low frequency control or accentuation which may be effected by the equalizer network 10 having components of the specific values above set forth is illustrated in FIGURE 2 of the drawing which is self explanatory. The shapes of these curves and the amplitudes thereof clearly demonstrate the superior and highly desirable characteristics of the equalizer network 10. Thus at a frequency of about 20 cycles per second the response can be varied between about −18 db and +23 db. At a frequency of about 25,000 cycles per second the response can be varied between about −22 db and +23 db.

I have shown a preferred embodiment of this invention, but it is obvious that numerous changes and omissions may be made without departing from its spirit.

What is claimed is:

1. A frequency control network comprising a transistor including a base electrode and an emitter electrode, means including an emitter resistor having a first terminal connected to said emitter electrode and a second terminal connected to a source of current, a potentiometer having a resistance element and an arm, a first capacitor connected between one end of said potentiometer resistance element and said emitter electrode, a second capacitor connected between the other end of said potentiometer resistance element and said base electrode, said potentiometer arm being connected to said emitter resistor second terminal, and means for applying an input signal between said base electrode and said emitter resistor second terminal.

2. The frequency control network of claim 1 including a resistor connected between said base electrode and said emitter resistor second terminal.

3. A frequency control network comprising a transistor including a base electrode and an emitter electrode, means including an emitter resistor having a first terminal connected to said emitter electrode and a second terminal connected to a source of current, a potentiometer having an arm and including a resistance element connected between said emitter electrode and said base electrode, an inductor connected between said potentiometer arm and said emitter resistor second terminal, and means for applying an input signal between said base electrode and said emitter resistor second terminal.

4. The frequency control network of claim 3 including capacitors respectively connected between said potentiometer resistance element and said base electrode and between said potentiometer resistance element and said emitter electrode.

5. The frequency control network of claim 3 comprising a capacitor, and an additional potentiometer having a resistance element connected in series with said capacitor between said base and emitter electrodes and an arm connected to said emitter resistor second terminal.

6. A frequency control network comprising a first transistor including a first base electrode and a first emitter electrode, a second transistor including a second base electrode connected to said first emitter electrode and a second emitter electrode, a first emitter resistor connected between said first emitter electrode and a current source terminal, a second emitter resistor connected between said second emitter electrode and said current source terminal, a potentiometer including an arm connected to said current source terminal and a resistance element, and a pair of first and second capacitors connecting opposite terminals of said potentiometer resistance element to the said emitter electrodes of the respective transistors.

7. A frequency control network comprising a first transistor including a first base electrode and a first emitter electrode, a second transistor including a second base electrode connected to said first emitter electrode and a second emitter electrode, a first emitter resistor connected between said first emitter electrode and a current source terminal, a second emitter resistor connected between said second emitter electrode and said current source terminal, a potentiometer including a resistance element connected between said base electrodes and an arm, and means including an inductor connecting said arm to said current source terminal.

8. The frequency control network of claim 7 including a pair of first and second capacitors connecting opposite terminals of said potentiometer to respective said emitter electrodes.

9. The frequency control network of claim 7 comprising a second potentiometer including an arm connected to said current source terminal and a second resistance element, and means including a capacitor connecting said second resistance element between said emitter electrodes.

References Cited by the Examiner

UNITED STATES PATENTS

| | | | |
|---|---|---|---|
| 2,752,432 | 6/1956 | Richter | 330—108 X |
| 2,866,859 | 12/1958 | Stanley. | |
| 2,892,042 | 6/1959 | Leypold et al. | 330—86 |
| 2,906,829 | 9/1959 | Levine | 330—94 |
| 2,955,259 | 10/1960 | Lax | 330—28 |
| 3,116,460 | 12/1963 | Nowlin. | |

NATHAN KAUFMAN, *Primary Examiner.*

F. D. PARIS, *Assistant Examiner.*